United States Patent [19]

Cruthis et al.

[11] 4,044,692
[45] Aug. 30, 1977

[54] RAILROAD CAR VEHICLE STOWING DEVICE

[75] Inventors: Robert Duane Cruthis; Robert Samuel Mills, both of Decatur, Ill.

[73] Assignee: Caterpillar Tractor Co., Peoria, Ill.

[21] Appl. No.: 626,381

[22] Filed: Oct. 28, 1975

[51] Int. Cl.² .......................... B60P 3/06; B60P 7/08; B61D 3/02; B61D 45/00

[52] U.S. Cl. ................................ 105/368 R; 105/464; 105/475

[58] Field of Search ............... 105/367, 368 B, 368 R, 105/368 T, 464, 475; 280/179 A, 179 B, 179 R

[56] References Cited

U.S. PATENT DOCUMENTS

| | | | |
|---|---|---|---|
| 919,798 | 4/1909 | Weinacht | 105/368 R X |
| 1,086,670 | 2/1914 | Jory et al. | 105/368 B X |
| 1,708,231 | 4/1929 | Moore et al. | 105/368 T |
| 1,776,935 | 9/1930 | Snyder | 105/368 R |
| 1,780,277 | 11/1930 | Seeley et al. | 105/368 R |
| 1,828,145 | 10/1931 | Johnston | 105/368 T |
| 1,846,750 | 2/1932 | Patterson | 105/368 T |

*Primary Examiner*—Robert J. Spar
*Assistant Examiner*—Howard Beltran
*Attorney, Agent, or Firm*—Wegner, Stellman, McCord, Wiles & Wood

[57] ABSTRACT

A railroad flatcar securement apparatus for a wheeled vehicle including a plurality of wheel chocks secured to the flatcar at positions fore and aft of the wheels of the vehicle and a plurality of tie rod members secured to the flatcar and to the vehicle at positions forwardly and rearwardly of the vehicle, the tie rod members being tensioned to prevent movement of the vehicle away from the flatcar whereby the vehicle is retained against the wheel chocks at all times.

12 Claims, 5 Drawing Figures

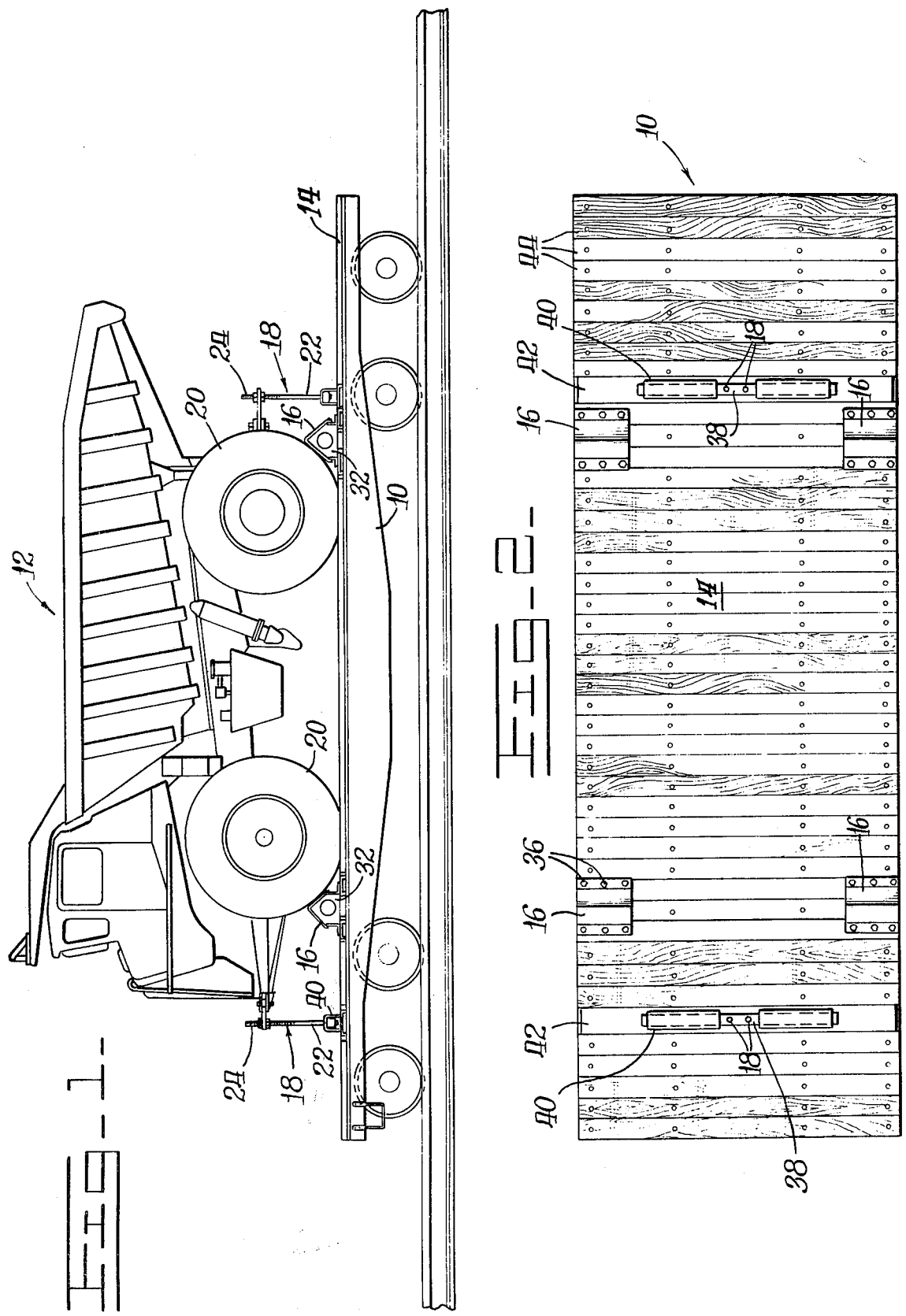

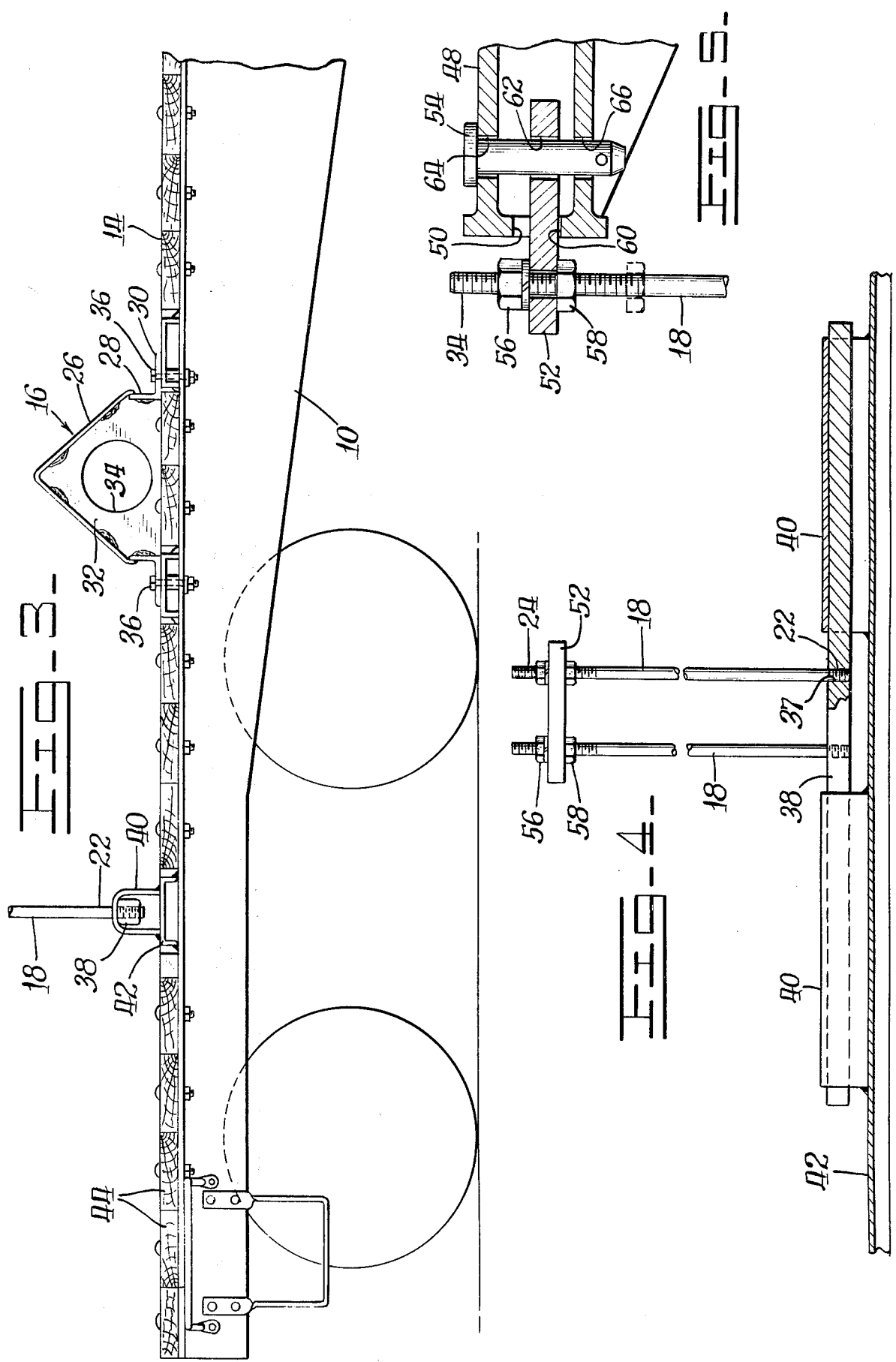

4,044,692

RAILROAD CAR VEHICLE STOWING DEVICE

BACKGROUND OF THE INVENTION

The present invention relates generally to shipping blocking means for preventing movement of a wheeled vehicle during shipment and, more particularly, to an apparatus for securing a heavy wheeled vehicle on the bed of a railroad flatcar.

Large mobile equipment is often transported on railroad flatcars. A heavy wheeled vehicle such as the truck illustrated in FIG. 1, which may weigh upwards of 50 tons, is seen in comparison with the standard railroad flatcar upon which it is to be transported. In order to assure retention of a wheeled vehicle on the flatcar during severe shocks or vibration occurring in transit, during abrupt starts and stops, or during humping in switching yards, it is necessary that the vehicle be firmly secured to the flatcar. Tremendous forces can be generated by such a truck while it is being transported on a railroad flatcar. For instance, during humping at 10 miles per hour, the 50-ton truck shown carried on a non-cushioned flatcar can generate a horizontal force of 315 tons. Forces are lower at slower speeds or with cushioned flatcars. The center of application of these forces occurs several feet over the bed of the flatcar along the line of the center of gravity of the truck. For the truck shown, this distance is approximately 5 feet. Hence, moments of 3.15 million foot-pounds can be generated by the truck while it is on the flatcar. These forces must be compensated for by adequately securing the truck to the flatcar so as to prevent relative motion therebetween.

In the past, it has been commonplace to employ wheel chocks to prevent forward or rearward movement of the vehicle. These wheel chocks were made of wood and nailed to the wooden bed of the flatcar. Wheel chocks so attached to the flatcar were not always permanently fixed since any great amount of force on the wheel chocks tended to pull the nails from the flatcar bed. To hold the vehicle down against the bed of the flatcar, chains extending between the vehicle and the flatcar and arranged in various configurations were utilized. The number of chains required tended to be excessive in order to adequately secure such a heavy vehicle. Even when a large quantity of chains were employed, the chains tended to be ineffective with a larger, heavier vehicle because of the tremendous loads placed on them. Abrupt starts and stops or severe shock causes chains to break, since the chains are permitted to become slack and then are pulled quickly or "snapped" to a high tension condition.

In addition, utilization of chains may be excessively costly for many applications. Placement of wheel chocks and chains involves much time and effort. Wheel chocks have to be correctly positioned and nailed down. Chains have to be individually drawn taut. With so many components, valuable time and labor is wasted during the process of shipping a vehicle. Chains and nailed down wooden chocks are also economically disadvantageous because they are not exceedingly durable and because they are easily misplaced or lost when they are detached from the vehicle or the flatcar.

SUMMARY OF THE INVENTION

It is the principal object of the present invention to provide an improved, simpler, less expensive means for securing a wheeled vehicle on a railroad flatcar for transit. More specifically, it is an object of the present invention to provide a securement apparatus which securely retains a heavy wheeled vehicle on a railroad flatcar at all times and under all railroad transport conditions, which reduces the work required to secure the vehicle to the flatcar, and which is capable of repeated and extended use. These objects are fulfilled by the present invention and, thus, a heavy wheeled vehicle may be shipped more efficiently and securely at less cost.

In accordance with the present invention, a securement apparatus is provided which is comprised of metal wheel chocks and complementing metal tie rod members. The wheel chocks are secured to the bed of the flatcar and are positioned in abutting relation with the wheels to restrain the vehicle from substantial horizontal movements. The tie rod members are positioned forwardly and rearwardly and are secured to and between the flatcar and the vehicle to restrain the vehicle from excessive upward vertical movement.

The tie rods are sufficiently rigid and are pretensioned so that the slackening and snapping effects encountered when chains are employed is alleviated, thereby avoiding broken tie-down members and retaining the heavy vehicle against the wheel chocks. Because the vehicle is retained against the wheel chocks, the wheel chocks can effectively absorb all of the force generated during transit.

In an exemplary embodiment of the present invention, the wheel chocks are welded or detachably secured to the bed of the flatcar by releasable bolts passing therebetween. The tie rod members are releasably secured to a pivotally movable tapping rod mounted on the bed of the flatcar. The releasability of the components permits removal of the components during loading and unloading of a vehicle and their replacement for railroad transport.

It is another feature of the present invention to allow removal of the vehicle while the securement apparatus remains attached to the flatcar. The tie rod members are pivotally movable to a prone position on the flatcar after being detached from the vehicle. The chocks need not be removed if the vehicle is lifted off the flatcar. The apparatus remains a part of the flatcar and cannot be lost or misplaced. Hence, there is a reduction both in the number of components comprising the securement apparatus and in the time and labor required to secure the vehicle to the flatcar.

In a preferred embodiment of the securement apparatus, the tie rod members have limited adjustability in order to permit varying degrees of tension on the tie rod members, to accommodate vehicles of various heights or sizes, and to allow varying mounting positions of the vehicle on the flatcar. The tie rod members have lateral mobility to accommodate for lateral changes in the mounting position of the vehicle. The tie rod members are vertically adjustable because of locking nuts screwed on an extended threaded portion of the tie rod members. An uppermost locking nut is tightened down to a tensioned position so as to provide for positive retention of the vehicle on the flatcar bed, while a lowermost locking nut is tightened upwardly to limit pitching of the vehicle relative to the flatcar. It is also intended to employ wheel chocks which are movable to a variety of positions on the flatcar and adapter plates attachable to the vehicle for receiving the tie rods and engaging the locking nuts, so that vehicles of varying configurations can be transported on the same flatcar.

Further features and advantages of the invention will readily be apparent from the following specification taken in conjunction with the accompanying drawings.

BRIEF DESCRIPTION OF THE DRAWINGS

FIG. 1 is a side elevation of a railroad flatcar transporting a truck secured by the apparatus of the present invention;

FIG. 2 is a plan elevation of the railroad flatcar showing the arrangement of the wheel chocks and the tie rod members;

FIG. 3 is an enlarged partial view of the railroad flatcar showing the attachment of the tie rod members and the wheel chocks;

FIG. 4 is an enlarged transverse view of the tie rod assembly; and

FIG. 5 is an enlarged partial sectional view of a tie rod member secured to a portion of the truck.

DESCRIPTION OF THE PREFERRED EMBODIMENT

Referring to FIG. 1, a railroad flatcar 10 transports a heavy, wheeled or rubber-tired vehicle, such as a truck 12. The truck 12 is carried on the floor or bed 14 atop the flatcar 10 and is restrained thereon by a securement apparatus comprised generally of a plurality of wheel chocks 16 and a plurality of substantially vertically oriented tie rod members 18. Both the wheel chocks 16 and the tie rod members 18 are semipermanently attached to the flatcar 10. Chocks can be permanently secured.

The wheel chocks 16 are positioned fore and aft of the truck wheels 20 and in abutment with the tread faces so as to prevent substantial horizontal movement of the truck 12 relative to the bed 14. Some of the tie rod members 18 are positioned at a forward portion of the truck 12 and some are positioned at a rearward portion of the truck 12. Each of the tie rod members 18 are positioned centrally fore and aft of the truck 12 and a lower end portion 22 secured to the flatcar 10 and an upper end portion 24 secured to the truck 12 so as to prevent substantial movement of the truck 12 vertically away from the bed 14.

During transport, the truck 12 is held against the flatcar bed 14 by the tie rod members 18 even though the truck 12 may be inclined to move upwardly away from the bed 14 because of the motion of the flatcar 10 and the compressability and resiliency of the tires on the wheels 20. Hence, the truck 12 has a tendency to pitch because of the generation of the aforementioned moment forces. The tie rod members 18 retain the truck 12 so that most of the vertical force is converted into horizontal force. These forces are then absorbed by the wheel chocks 16 acting on the tread faces on the tires. The truck 12 is thusly held in place by the tie rod members to prevent the wheels 20 from jumping over the wheel chocks 16 and by the wheel chocks 16 to prevent the wheels 20 from moving along the bed 14. The positioning of the wheel chocks 16 and the tie rod members 18 relative to the truck 12 and the bed 14 can best be seen in FIG. 1.

The preferred construction of the wheel chocks 16 can be seen in FIGS. 2 and 3. The wheel chocks 16 are substantially hollow, triangular-shaped steel members having an upper load bearing surface plate 26, angle irons 28 with outwardly extending securing flanges 30 at two corners forming a base surface, and spaced side panels 32 welded to and supporting the plate 26 and the angle irons 28. An aperture 34 is provided in each of the panels 32 to provide for easy handling of the wheel chocks 16. Each of the wheel chocks 16 is secured to the bed 14 by utilizing releasable bolts 36 which pass through both the bolting flanges 30 and the bed 14, both of which have been provided with coinciding predrilled holes for the bolts 36 to pass through.

With reference to FIGS. 3 and 4, it is seen that the tie rod members 18 have oppositely disposed threaded end portions 22 and 24. The lower end portion 22 of a tie rod member 18 is anchored to the flatcar 10 by being screwed into a threaded aperture of a heavy tapping rod or strip 38. Each of the tapping rods 38 is disposed in an inverted channel-like bracket 40 which is welded to one of the longitudinally spaced, transversely extending metal holding beams 42 which has been substituted for one of the wooden floor boards 44 and is thereby integral with the bed 14. The bracket 40 has an interior space slightly larger than the width of the tapping rod 38 which permits the tapping rod 38 to rotate within the bracket 40 whereby the tie rod members 18 may be longitudinally tipped or pivoted to a full prone position level with the bed 14. The tapping rods 38 are also movable laterally with the bracket 40 so that the tapping rod 38 may be laterally shifted or, if necessary, completely removed through an open end of the bracket 40. The bracket 40 is bifurcated so as to permit exposure of the center portion of the tapping rod 38. The apertures 37 into which the tie rod members 18 are secured are disposed within this central exposed portion, thereby providing an exit for the upwardly extending tie rod members 18. The open portion of the bracket 40 is of such size that it permits the tie rod members 18 to be pivoted to a prone position or moved laterally while secured to the tapping rod 38.

The upper threaded portion 24 of the tie rod members 18 are secured to the truck 12. A truck 12 is provided with a bumper 48, drawbar or other frame portion, such as that shown in FIG. 4, having an aperture 50 into which an adapter plate 52 may be inserted and thereafter secured by a lock pin 54 which extends through an adapter plate aperture 62 and bumper apertures 64 and 66. The aperture 50 is slightly larger than the adapter plate 52 to aid in its connection. The limited movement provided for the tapping rod 38 within the bracket 40 also allows for facile connection of the tie rod members 18 with the adapter plate 52 which would otherwise be more difficult if the truck 12 is slightly misplaced on the bed 14.

As shown in FIGS. 4 and 5, the adapter plate 52 receives the tie rod members 18 along their upper threaded end portions 24. An uppermost locking nut 56 and a lowermost locking nut 58 are provided to engage the adapter plate 52. The uppermost nut 56 is tightened down on the adapter plate 52 to a tensioned position so that the adapter plate is forced down onto the lower portion 60 of the aperture 50 and a sufficient downward force is provided for positive retention of the truck 12 on the bed 14. The lowermost nut 58 is brought snugly up against the bottom of the adapter plate 52 to limit movement of the truck 12 relative to the tie rod members 18.

By providing an extensive upper threaded portion 24 so that the locking nuts 56 and 58 may be screwed downwardly or upwardly to a variety of positions, the tie rod members 18 can be employed in a manner to accommodate vehicles of various types and sizes. It is also intended that the adapter plate 52 be modified for use with other vehicles so that only a modified plate need be used without altering the remainder of the securement apparatus.

As previously stated, the tie rod members 18 are movable to a prone position because of the pivotal action of the tapping rods 38. When the tie rod members 18 are in a prone position and still anchored to the flatcar 10 via the tapping rods 38 and the brackets 40, the truck 12 may be driven onto the flatcar 10 over the tie rod members 18 without difficulty and without the possibility of losing or misplacing the tie rod members 18. The wheel chocks 16 may be removed when such a loading procedure is employed and are replaceable as tightly and as conveniently as possible when the truck 12 is positioned on the flatcar 10. The tie rod members 18, however, may be removed whenever necessary or desired. The truck 12 may be lifted onto the flatcar 10 by a crane (not shown) eliminating the need for removal of the wheel chocks 16. The tie rod members 18 may still be pivoted out of the way or completely removed as desired. Provision may be made for mounting the wheel chocks 16 and the tie rod members 18 in other locations so that the flatcar 10 is easily adapted for varying types of vehicles. This objective is accomplished by providing additional bolt passages in the flatcar bed 14 for the bolts 36 securing the wheel chocks 16 and additional brackets 40 for the tapping rods 38.

When a heavy wheeled vehicle is secured to a flatcar in the manner described, displacement of the vehicle during rail shipment is effectively eliminated. In design studies it has been found that steel tie rods 1¼ inches in diameter in the positions shown will have sufficient strength to retain a wheeled vehicle of the type and size shown on cushioned flatcars, while tie rods 2 inches in diameter are required on non-cushioned cars. Obviously, for lesser loads, smaller tie rods may be employed.

We claim:

1. A railroad flatcar securement apparatus for a wheeled vehicle comprising:
   a plurality of wheel chocks;
   means for securing said wheel chocks to said flatcar at positions fore and aft of the wheels of the vehicle and in contact therewith;
   a plurality of tie rod members;
   means for securing said tie rod members to the flatcar at positions respectively forwardly and rearwardly of the vehicle including at each position
      an inverted channel-shaped bracket fixed laterally across the flatcar,
      an elongate tapping rod inserted within said bracket, said tapping rod being rotatable on a lateral axis and being laterally movable within said bracket, said bracket having a portion cut away to expose a portion of said tapping rod, and
      means for securing the lower end of at least one of said tie rod members to the exposed portion of said tapping rod so that said one tapping rod rotates within said bracket as said one tie rod member is pivoted relative to the flatcar, said one tie rod member extending outwardly from said tapping rod with its upper end adjacent the vehicle when pivoted to an upright position, said one tie rod member thereby being laterally movable relative to the flatcar and pivotally movable toward a prone position on the bed of the flatcar; and
   means for securing the upper ends of said tie rod members to the vehicle forwardly and rearwardly whereby said tie rod members are tensioned with the vehicle in position for transport to prevent movement of the vehicle in a direction away from the flatcar in excess of the tensioned position and whereby the wheels of the vehicle are retained against said wheel chocks at all times and under all railroad transport conditions.

2. The securement apparatus of claim 1 wherein said means for securing said wheel chocks is releasable to provide for removal and replacement of said wheel chocks.

3. The securement apparatus of claim 1 wherein said means for securing said tie rod members to the flatcar is releasable to provide for removal and replacement of said tie rod members.

4. The securement apparatus of claim 1 wherein said means for securing said tie rod members to the vehicle includes means for adjusting the length of each of said tie rod members extending between the vehicle and the flatcar so that said tie rod members may be tensioned to secure vehicles of different sizes to the flatcar.

5. The securement apparatus of claim 1 wherein said tie rod members are disposed centrally both forwardly and rearwardly of the vehicle.

6. The securement apparatus of claim 5 wherein at least two tie rod members are disposed at each end of the vehicle.

7. A railroad flatcar securement apparatus for a wheeled vehicle comprising:
   a plurality of wheel chocks;
   means for securing said wheel chocks to said flatcar at positions forward of some and rearward of the remaining vehicle wheels and in contact therewith;
   a plurality of upright tie rod members;
   means for securing the lower portion of said tie rod members to the flatcar at positions respectively forwardly and rearwardly of the vehicle; and
   means for securing each of said tie rod members to the vehicle forwardly and rearwardly including
      a locking nut carried by each of said tie rod members, and
      means carried by the frame of the vehicle for receiving each of said tie rod members and having an upper surface against which each of said nuts is tightened, each of said tie rod members having a threaded upper portion for receiving its respective nut, each of said threaded portions being positioned relative to said receiving means to permit each of said nuts to be tightened downwardly against said upper surface in order to limit upward movement of the vehicle relative to the flatcar.

8. The securement apparatus of claim 7 wherein said nuts are tightened such that said tie rod members are tensioned to provide sufficient force for positive retention of the vehicle on the flatcar.

9. The securement apparatus of claim 7 further including an additional locking nut carried by each of said tie rod members for engaging said receiving means, each of said tie rod members having a threaded portion for receiving said additional nuts, each of said threaded portions for said additional nuts being positioned relative to said receiving means to permit each of said additional nuts to be tightened upwardly against a lower surface of said receiving means to limit downward movement of the vehicle relative to the tie rod members.

10. The securement apparatus of claim 9 wherein said receiving means comprises:
   an adapter plate for receiving said tie rod members and having upper and lower surfaces against which said nuts are locked; and
   means on the vehicle for releasably securing said adapter plate thereto.

11. A railroad securement apparatus for a wheeled vehicle comprising:
   a plurality of wheel chocks;
   means for releasably securing said wheel chocks to the flatcar at positions forward of some and rearward of the remaining vehicle wheels and in contact therewith to prevent the vehicle from moving horizontally along the flatcar;
   a plurality of tie rod members;
   a first tapping rod member carried by the flatcar forwardly of the vehicle pivotally mounted to pivot about a lateral axis, at least one of said tie rod members having one end portion secured to said first tapping rod member and having its other end portion received by the vehicle at a forward position;
   a second tapping rod member carried by the flatcar rearwardly of the vehicle pivotally mounted to pivot about a lateral axis, at least one of said tie rod members having one end portion secured to said second tapping rod member and having its other end portion received by the vehicle at a rearward position;
   means carried by the frame of the vehicle for receiving each of said tie rod members and having upper and lower surfaces; and
   locking members disposed on each of said tie rod members along said other end portion to engage the upper and lower surfaces of said receiving means so as to retain the vehicle against movement on the flatcar, said locking members being tightened to tension said tie rod members extending between the vehicle and the flatcar to prevent the vehicle from moving vertically away from the flatcar beyond the tensioned position and thereby securing the vehicle against upward and downward movement on the flatcar during rail transport.

12. The securement apparatus of claim 11 wherein said wheel chocks are attached permanently to the flatcar in predetermined locations.

* * * * *